United States Patent
Imai et al.

(10) Patent No.: US 9,249,817 B2
(45) Date of Patent: Feb. 2, 2016

(54) WOODEN MEMBER JOINT STRUCTURE

(71) Applicant: Sumitomo Forestry Co., Ltd., Tokyo (JP)

(72) Inventors: Junichi Imai, Tokyo (JP); Hiroki Ishiyama, Tokyo (JP); Hiroki Nakashima, Tokyo (JP)

(73) Assignee: Sumitomo Forestry Co., Ltd., Tokyo (JP)

( * ) Notice: Subject to any disclaimer, the term of this patent is extended or adjusted under 35 U.S.C. 154(b) by 147 days.

(21) Appl. No.: 13/793,670

(22) Filed: Mar. 11, 2013

(65) Prior Publication Data
US 2014/0093306 A1 Apr. 3, 2014

(30) Foreign Application Priority Data
Mar. 27, 2012 (JP) .................. 2012-071034

(51) Int. Cl.
*F16G 11/12* (2006.01)
*F16B 9/02* (2006.01)
*F16B 5/02* (2006.01)
*E04B 5/12* (2006.01)
*F16B 37/12* (2006.01)

(52) U.S. Cl.
CPC ............ *F16B 9/026* (2013.01); *F16B 5/0275* (2013.01); *F16B 5/0291* (2013.01); *E04B 5/12* (2013.01); *F16B 37/125* (2013.01); *Y10T 403/36* (2015.01)

(58) Field of Classification Search
CPC ............. Y10T 403/36; Y10T 403/362; Y10T 403/364; Y10T 403/366; Y10T 403/368; Y10T 403/39; Y10T 403/3986; Y10T 403/3993; E04B 5/12; F16B 37/125; F16B 9/026; F16B 5/0275; F16B 5/0291

USPC ......... 403/180, 182, 183, 184, 187, 188, 200, 403/201; 52/295, 655.1; 411/389, 412
See application file for complete search history.

(56) References Cited

U.S. PATENT DOCUMENTS

| | | | | |
|---|---|---|---|---|
| 1,574,466 | A * | 2/1926 | Ellis .................... | F16D 9/06 411/389 |
| 2,525,217 | A * | 10/1950 | Glitsch .................... | 292/256.73 |
| 6,253,705 | B1 * | 7/2001 | Pollock et al. .............. | 119/53.5 |
| 6,299,397 | B1 * | 10/2001 | Mengel .................... | 411/24 |

(Continued)

FOREIGN PATENT DOCUMENTS

| | | |
|---|---|---|
| FR | 2439321 | 5/1980 |
| JP | 2001355287 A | 12/2001 |

(Continued)

*Primary Examiner* — Gregory Binda
*Assistant Examiner* — Nahid Amiri
(74) *Attorney, Agent, or Firm* — The Webb Law Firm

(57) ABSTRACT

A wooden member joint structure having high strength against load repeatedly applied in opposite directions, with improved work efficiency in joining the wooden member to a mating member. A screw member having spiral protrusion on its outer peripheral surface and an axial hollow hole is threaded axially into a wooden column. A distal end of joint bolt is threadedly engaged with bottom of the hollow hole. The joint bolt has an integrally formed flange, and the flange is threaded into the column together with the screw member with its contact surface firmly pressed against end face of the screw member. A joint device is clamped between a fastening nut threadably mounted on a proximal end of the joint bolt and the flange and coupled to the screw member via the joint bolt. The joint device is secured to a foundation by an anchor bolt protruding therefrom and a fastening nut.

11 Claims, 12 Drawing Sheets

(56) References Cited

U.S. PATENT DOCUMENTS

| | | | |
|---|---|---|---|
| 6,453,634 B1 * | 9/2002 | Pryor | 52/713 |
| 6,827,520 B2 * | 12/2004 | Reichartz | 403/192 |
| 6,843,627 B2 * | 1/2005 | Childs et al. | 411/7 |
| 7,290,972 B2 * | 11/2007 | Gauthier | 411/387.1 |
| 7,386,960 B2 * | 6/2008 | Molteni | 52/238.1 |
| 8,336,267 B2 * | 12/2012 | Montague et al. | 52/295 |
| D678,757 S * | 3/2013 | Imai et al. | D8/387 |
| 2003/0053855 A1 * | 3/2003 | Baur | 403/188 |
| 2003/0230032 A1 * | 12/2003 | Shahnazarian et al. | 52/167.3 |
| 2007/0177959 A1 * | 8/2007 | Chopp et al. | 411/389 |

FOREIGN PATENT DOCUMENTS

| | | |
|---|---|---|
| JP | 2007077611 A | 3/2007 |
| JP | 2008050776 A | 3/2008 |

\* cited by examiner

WOODEN MEMBER JOINT STRUCTURE

CROSS REFERENCE TO RELATED APPLICATIONS

This application claims priority to Japanese patent application JP 2012-071034, filed Mar. 27, 2012, the disclosure of which is hereby incorporated by reference in its entirety.

BACKGROUND OF THE INVENTION

1. Technical Field

The present invention relates to a wooden member joint structure for use in joining a wooden column to a mating member, such as a wooden beam or foundation, in a wooden building, and, more particularly, to a structure in which a screw member threaded into a wooden member is joined to a mating member via a joint device.

2. Related Art

It is proposed to join a wooden column to a wooden beam, foundation or the like by a so-called rigid joint that allows a bending moment to be transferred therebetween to form a skeleton having a rigid-frame structure in a wooden building. When a horizontal force is repeatedly applied to such a structure alternately in opposite directions during an earthquake, for example, a bending moment acts on the joint between the column and the beam or foundation. The joint needs to maintain sufficient strength against such a bending moment.

A joint structure for a rigid-frame structure using a wooden column is disclosed in Patent Literature 1, for example.

In this joint structure, the column is joined to the foundation via joint devices at two locations at the lower end of the wooden column. The joint structure has the following configuration.

Two screw members having a hollow hole axially extending from one end face thereof are axially threaded into a lower end of the column. A long bolt is inserted into the hollow hole of each screw member, and the upper end of the long bolt is threadedly engaged with the bottom of the hollow hole. In this way, the upper end of the long bolt is connected to the corresponding screw member, and the lower end of the long bolt is connected to a joint device coupled to the foundation. Specifically, an intermediate nut and a fastening nut are threadedly engaged with a male thread formed at the lower end of the long bolt, and the joint device is coupled to the screw member by clamping the joint device sandwiched between the intermediate nut fastened until it firmly abuts against the end face of the screw member and the fastening nut.

In the above joint structure, when a large bending moment is applied to the lower end of the column, an upward pulling force is applied to the location where one of the screw members is threaded into the wooden column and a tensile force is applied to the long bolt threadedly inserted into the hollow hole of the screw member. In addition, a compressive force is applied between the other screw member and the joint device via the intermediate nut. The long bolt to which the tensile force is applied undergoes elongation in such a manner that it is pulled out of the hollow hole of the screw member, and tensile stress causes plastic deformation of the long bolt when the elongation exceeds the elastic region. After that, when a bending moment in the opposite direction is generated, deformation occurs in such a direction that the lower end of the column is pressed against the joint device and a compressive force is applied to the long bolt, which has undergone plastic deformation caused by the tensile stress. In other words, the upper surface of the joint device is pressed against the intermediate nut and a compressive force acts to press the long bolt into the hollow hole of the screw member, and the intermediate nut is therefore returned to the original position where it abuts against the screw member.

In this way, the column is held joined to the foundation via the joint device in the joint structure even when a bending moment is repeatedly applied to the joint alternately in opposite directions.

[Patent Literature 1] JPA-Publication No. 2007-077611

In the joint structure disclosed in Patent Literature 1, even when a bending moment is repeatedly applied to the joint alternately in opposite directions as described above, the joint between the column and the foundation can be maintained and the energy of earthquake motion can be absorbed by plastic deformation of the long bolt.

However, there is the following problem desired to be solved about threading the screw member axially into the column in the above joint structure.

It is desired that the long bolt is previously inserted into the hollow hole of the screw member with its proximal end being threadedly engaged with the bottom of the hollow hole and the intermediate nut is also previously threadedly mounted on the distal end of the long bolt and fastened until it firmly abuts against the lower end face of the screw member when the screw member is threaded into the wooden column. When the long bolt is threadedly engaged with the bottom of the hollow hole and the intermediate nut is fastened after only the screw member is threaded into the wooden column, it is difficult to fasten the intermediate nut until it firmly abuts against the screw member because the rotation of the screw member cannot be constrained. Thus, the screw member needs to be threaded into the column after the long bolt has been threadedly engaged with the bottom of the hollow hole and the intermediate nut has been fastened. In this case, however, it is difficult to thread the screw member into the column such that the lower surface of the intermediate nut is generally flush with the mating surface of the column with the joint device. In other words, the torque applied to thread the screw member into the column cannot be applied to the intermediate nut or directly to the screw member.

In addition, partly because the intermediate nut has to be threadably mounted on the long bolt after the long bolt is threadedly inserted into the hollow hole of the screw member and partly because the joint device is clamped between the intermediate nut and the fastening nut, the number of parts constituting the joint is too large to improve the work efficiency. Further, there is a need for improvement of the proof strength of the connection between the long bolt and the joint device against a large load.

The present invention has been made in view of the above circumstances, and it is, therefore, an object of the present invention to improve the work efficiency in joining a wooden member to a mating member and to provide a wooden member joint structure having high resistance against a load which is repeatedly applied alternately in opposite directions.

SUMMARY OF THE INVENTION

To solve the problem, the invention according to Aspect 1 provides a wooden member joint structure, comprising: a screw member having a rod-like shaft portion and a spiral blade formed on an outer peripheral surface of the shaft portion, wherein a hollow hole is formed in the screw member and the hollow hole is extending axially from an end face of the shaft portion, the screw member being for fixedly threaded into a wooden member; a joint bolt inserted into the hollow hole of the screw member, the joint bolt having a proximal end threadedly joined with a female thread formed in the vicinity of the bottom of the hollow hole; and a joint device coupled to a distal end of the joint bolt, the joint device being for secured to a mating member to which the wooden member is to be joined; wherein the wooden member joint structure is for joining the wooden member to the mating member via the screw member, the joint bolt and the joint device, the joint bolt has a flange, a proximal shaft portion is extending proximally from the flange, and a distal shaft portion is extending distally from the flange and coaxially with the proximal shaft portion; the flange is firmly pressed against an end face of the shaft portion of the screw member by threading the proximal shaft portion into the female thread through the hollow hole of the screw member; and the portion of the proximal shaft portion between the portion threaded into the female thread and the flange is separated from an inner peripheral surface of the hollow hole; the wooden member joint structure further comprising a nut threadedly mounted on the distal shaft portion; wherein the joint device and the joint bolt are coupled to each other with the joint device clamped between the nut and the flange.

It is generally known that the greater the amount of plastic deformation or deformation allowed before ultimate fracture is, the more tenacious or tougher the structural body is. In particular, a statically indeterminate structure, such as a rigid-frame structure, each part of which is allowed to undergo large plastic deformation, has an improved load bearing capacity because a redistribution of bending moment occurs when a large load causes plastic deformation in a part of the skeleton. In addition, even when a load is repeatedly (vibration is) applied as during an earthquake, the safety against ultimate fracture is increased because plastic deformation occurs to absorb energy of vibration and vibration is attenuated.

In this wooden member joint structure, the joint bolt inserted into the hollow hole of the screw member has a proximal end coupled to the screw member and a proximal shaft portion inserted into the screw member but separated from the inner peripheral surface of hollow hole. The distal end of the joint bolt is coupled to the mating member via the metal joint device. Thus, when a force acts to separate the joint between the column and the mating member, a force acts to pull the joint bolt out of the screw member and tensile stress is applied to the proximal shaft portion. As a result, the proximal shaft portion undergoes elongation between the portion threadedly engaged with the screw member and the flange, in other words, the joint bolt is allowed to undergo larger plastic deformation, resulting in a more tenacious and tougher structure.

When the load is inverted and a force acts to press the wooden member against the mating member, the joint bolt having a proximal end threadedly engaged with the female thread receives a force which acts to press the joint bolt into the hollow hole, in other words, a compressive force, acting from the joint device via the flange. Thus, a compressive strain occurs in the proximal shaft portion of the joint bolt, which has undergone plastic deformation by the effect of tensile stress, and the flange is returned to its original position where it is in contact with the screw member with the joint device sandwiched between the flange and the nut. The energy of vibration is absorbed by such plastic deformation of the joint bolt.

In addition, when the screw member is threaded into the wooden member with the joint bolt being inserted into and threadedly engaged in the hollow hole of the screw member, the screw member can be threaded into the wooden member by applying torque about the axis of the screw member from the distal shaft portion side with a tool engaged with the flange or the distal shaft portion. Even when the flange is partially cut off so that engaging means for a tool or the like can be disposed at the flange, the flange of the joint bolt has sufficient strength because the flange is formed integrally with the proximal shaft portion and the distal shaft portion.

The invention according to Aspect 2 is the wooden member joint structure according to Aspect 1, wherein a plurality of recesses are formed at a distal surface of the flange, the recesses being engageable with a tool for rotating the joint bolt about the axis thereof.

In this wooden member joint structure, because a plurality of recesses are formed in the distal surface of the flange, the flange can be rotated about the axis by engaging a tool with the recesses. Thus, the screw member can be threaded into the wooden member until the flange is embedded in the wooden member by rotating the flange from the distal shaft portion side with the joint bolt being integrally threaded into the screw member.

The invention according to Aspect 3 is the wooden member joint structure according to Aspect 1 or 2, wherein the distal shaft portion has a male thread portion having a male thread with which the nut is threadedly engageable, and an enlarged diameter portion between the male thread portion and the distal surface of the flange, the enlarged diameter portion having an outside diameter greater than an outside diameter of the male thread portion.

In this wooden member joint structure, when the distal shaft portion of the joint bolt is inserted through a bolt hole of the joint device and the joint device is coupled between the flange and the nut, the portion of the distal shaft portion on which the nut will be threadedly mounted can be easily inserted into the bolt hole, and the gap or clearance between the inner peripheral surface of the bolt hole and the portion having an enlarged diameter can be smaller. As a result, joint bolt is prevented from displacing in a direction perpendicular to the axis of the joint bolt relative to the joint device.

The invention according to Aspect 4 is the wooden member joint structure according to any one of Aspect 1 to 3, wherein the joint bolt has a projection on an outer peripheral surface of the portion between the portion threaded into the female thread in the hollow hole and the flange to decrease the distance to the inner peripheral surface of the hollow hole.

In this wooden member joint structure, because the joint bolt has projections on an outer peripheral surface of the portion inserted into the hollow hole of the joint bolt, the distance between this portion and the hollow hole is smaller. Thus, the joint bolt is prevented from buckling in the hollow hole when a force which acts to press the joint bolt into the hollow hole, in other words, a compressive force, is applied thereto.

The invention according to Aspect 5 is the wooden member joint structure according to any one of Aspect 1 to 4, wherein the flange has a dimension measured perpendicular to the axis of the distal shaft portion which increases from a proximal side to a distal side of the flange.

In this wooden member joint structure, because the flange has a radial dimension which increases from proximal to distal, the peripheral surface of the flange can be firmly pressed in a "wedge" like manner against the inner peripheral surface of the hole formed in the wooden member when the flange is threaded into the wooden member. Thus, relative displacement between the joint bolt and the screw member in a direction perpendicular to the axis of the joint bolt can be reduced.

The invention according to Aspect 6 is the wooden member joint structure according to any one of Aspects 1 to 5, wherein the female thread formed in the hollow hole of the screw member is located at a middle portion in an axial length of the screw member.

In this wooden member joint structure, a tensile force applied to the joint bolt is transferred from the proximal end of the joint bolt to the screw member, and acts as an axial force on the screw member. Then, the force is transferred from the outer peripheral surface of the screw member to the wooden member. At this time, because a compressive force is applied to the portion of the screw member on the pulling side from the location where the joint bolt is threaded with the screw member and a tensile force is applied to the portion of the screw member proximal to the location where the joint bolt is secured thereto, a force is distributed over a wide range in the axial direction of the screw member when transmitted to the wooden member. Thus, because the female thread is located at a middle portion in the axial length of the screw member typically at generally half the axial length, large stress is prevented from being concentrated on the wooden member by a force which acts to pull the screw member out. As a result, the load bearing capacity of the screw member against pulling out of the wooden member is improved.

As described above, the wooden member joint structure according to the present invention can realize a tough building structure by increasing the plastic deformation of the joint before it reaches an ultimate state, and can facilitate the work of threading a screw member into a joint region of a wooden member.

This application is based on the Patent Applications No. 2012-071034 filed on Mar. 27, 2012 in Japan, the contents of which are hereby incorporated in its entirety by reference into the present application, as part thereof.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiments. Among the disclosed changes and modifications, those which may not literally fall within the scope of the patent claims constitute, therefore, a part of the present invention in the sense of doctrine of equivalents.

DETAILED DESCRIPTION OF THE PREFERRED EMBODIMENT

Description is hereinafter made of embodiments of the present invention with reference to the drawings.

Figure 1:
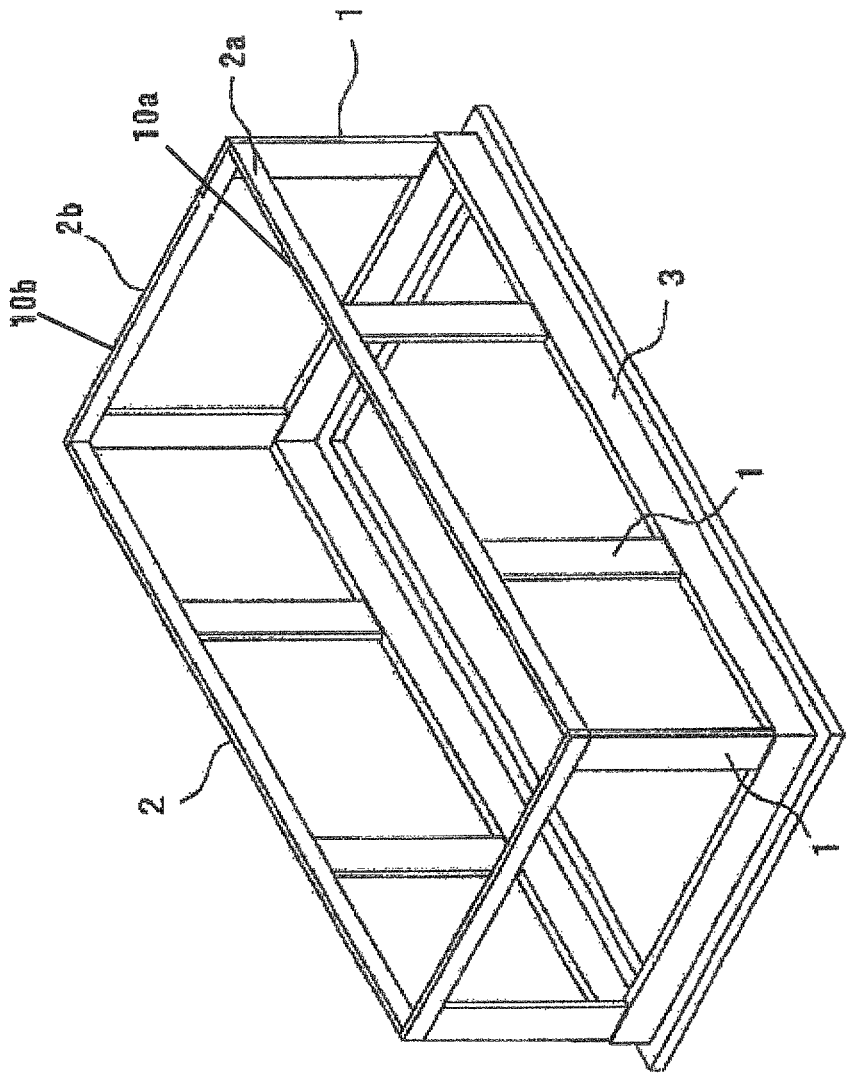
FIG. 1 is a schematic perspective view, illustrating a skeleton of a wooden building in which a wooden member joint structure according to an embodiment of the present invention is suitably used.

FIG. 1 is a schematic perspective view, illustrating a skeleton of a wooden building in which a wooden member joint structure according to an embodiment of the present invention is suitably used.

The skeleton has a rigid flume body 10 in which wooden columns 1 are joined to a wooden beam 2 and a foundation 3 in such a way that a bending moment can be transferred between the columns 1 and the beam 2 and between the columns 1 and the foundation 3, and is formed by combining a plurality of rigid frame bodies 10 on the concrete foundation 3. Each rigid frame body 10 has what is called a beam-priority structure formed by joining a wooden beam 2 mounted on wooden columns 1 thereto. The column 1 of each rigid frame body 10 has a flat rectangular cross-section with a long side extending in the axial direction of the beam 2 supported thereon and a short side extending in a direction perpendicular to the axis of the beam 2. The beam 2 has a flat cross-sectional shape which is long in a vertical direction and short in a horizontal direction. Therefore, the joint between the column and beam of each rigid-frame structural body has a structure which resists bending in one direction which produces compressive stress and tensile stress in the direction of the long side of the cross-section. A first rigid frame body 10$a$ and a second rigid frame body 10$b$ are joined to each other with an end face of the beam 2$a$ of the first rigid frame body 10$a$ abutting against a side of the beam 2$b$ of the second rigid frame body 10$b$ to form a three-dimensional rigid-frame structure.

Figure 2:
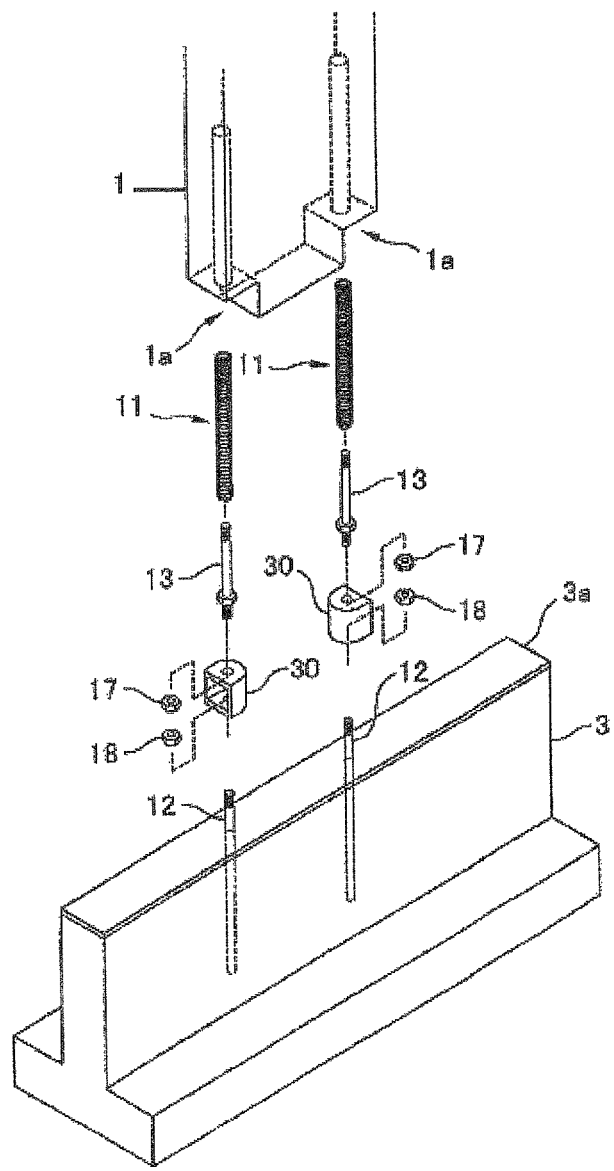
FIG. 2 is an exploded perspective view, illustrating a joint structure according to one embodiment of the present invention.
Figure 3:
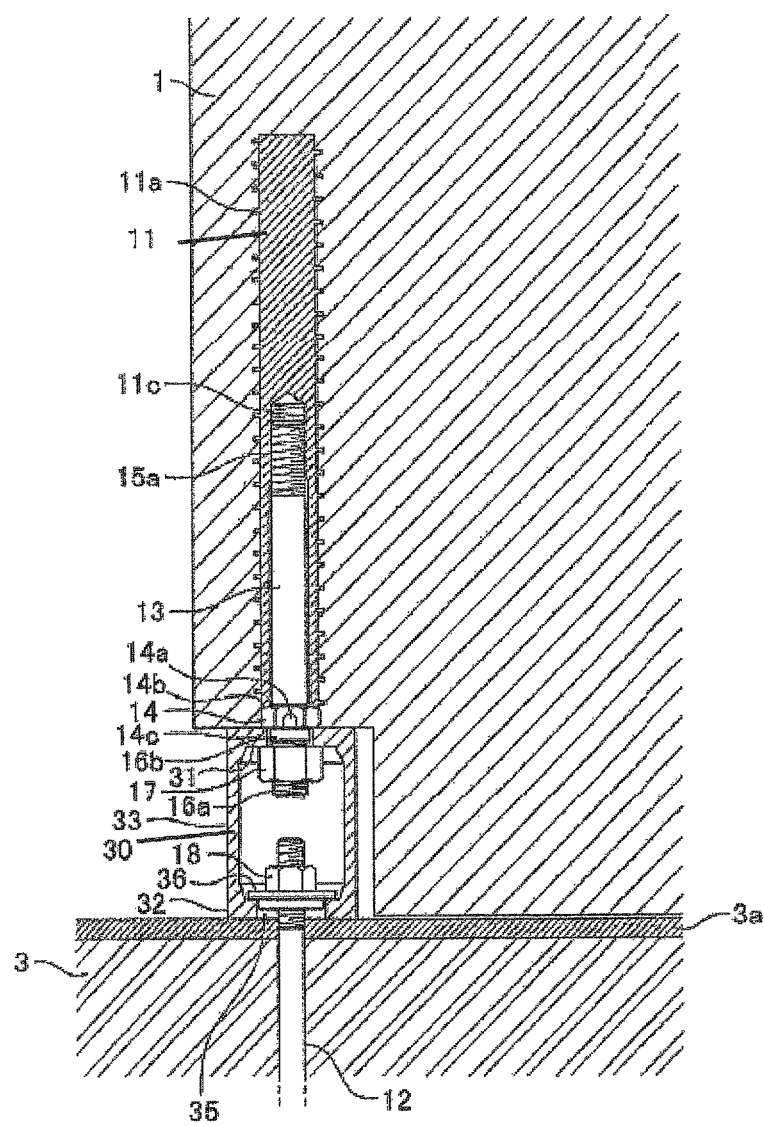
FIG. 3 is an enlarged cross-sectional view of the joint structure shown in FIG. 2, illustrating a cross-section of a rigid frame body taken parallel to the axis thereof.

FIG. 2 is an exploded perspective view, illustrating a joint structure according to one embodiment of the present invention. FIG. 3 is an enlarged cross-sectional view of the same joint structure, illustrating a cross-section of a rigid frame body taken parallel to the axis thereof.

In this joint structure, the column 1 has cutouts 1a at both ends in the long side direction at the lower end thereof, and a screw member 11 is axially threaded into the column 1 from each cutout 1a. A joint device 30 is installed in each cutout 1a, and the screw member 11 and the joint device 30 are coupled by a joint bolt 13.

On the other hand, anchor bolts 12 are vertically embedded in the foundation 3, as a mating member, at positions corresponding to the positions where the screw members 11 are threaded into the column 1 with their heads protruding from the upper surface of the foundation 3. The joint devices 30 are secured to the foundation 3 by fastening nuts 18 threadedly mounted on the anchor bolts 12. As a result, the foundation 3 and the column 1 are joined to each other via the anchor bolts 12, the joint devices 30, the joint bolts 13, and the screw members 11.

Figure 4A:
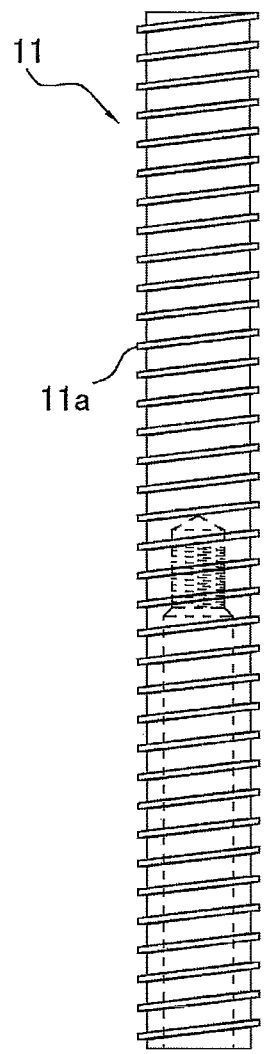
FIG. 4A shows a side view of a screw member used in the joint structure shown in FIG. 2 and FIG. 3.
Figure 4B:
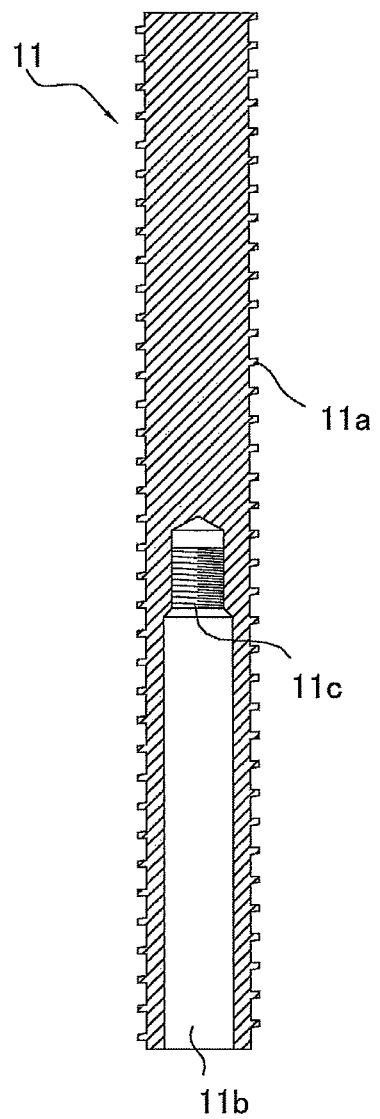
FIG. 4B shows a cross-sectional view of a screw member used in the joint structure shown in FIG. 2 and FIG. 3.

As shown in FIGS. 4A and 4B, the screw member 11 is provided with a rod-like steel shaft member and a spiral protrusion 11a as a blade extending from an outer peripheral surface thereof. The protrusion 11a is engaged with the column 1 when the screw member 11 is threaded into the column 1 so that a force can be transferred between the screw member 11 and the column 1 in the axial directional of the screw member 11 and a direction perpendicular to the axis. The screw member 11 has a hollow hole 11b extending axially from an end face thereof, and a female thread 11c is formed in the bottom of the hollow hole 11b. The proximal end of the joint bolt 13 inserted into the hollow hole 11b is threadedly engaged with the female thread 11c.

The female thread 11c is formed at generally half the axial length of the screw member 11 so that the proximal end of the joint bolt 13 can be threadedly engaged with the screw member 11 at generally half the axial length of the screw member 11. Thus, the force transferred from the protrusion 11a of the screw member 11 to the column 1 is distributed to a wide range in the axial direction of the screw member 11 and large stress is prevented from being concentrated on the column 1.

Figure 5:
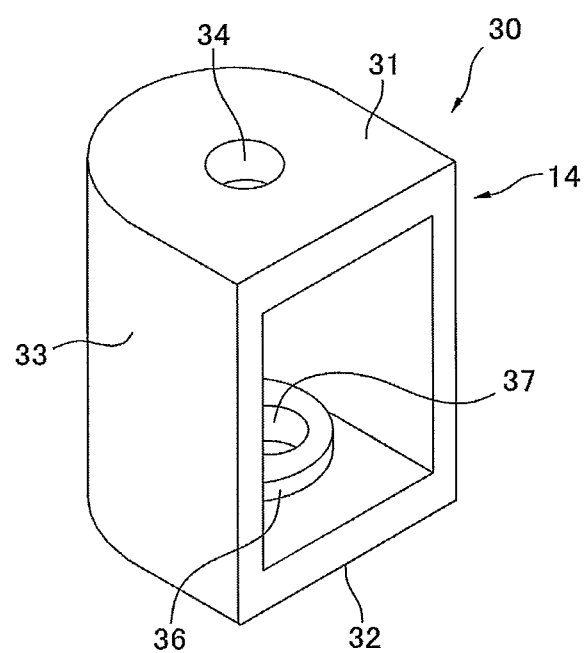
FIG. 5 is a perspective view of the metal joint device used in the joint structure shown in FIG. 2 and FIG. 3.

As shown in FIG. 5, the joint device 30 has two horizontal plate portions 31 and 32 facing each other and a side plate portion 33 connecting the horizontal plate portions 31 and 32, and the side plate portion 33 is provided in such a manner that an opening is formed between the horizontal plate portions 31 and 32 at a section along the circumference thereof.

A bolt hole 34 is formed through the upper horizontal plate portion 31. The joint bolt 13 and the joint device 30 are coupled with each other by inserting the joint bolt 13 through the bolt hole 34 and threadably mounting a fastening nut 17 on the joint bolt 13.

The lower horizontal plate portion 32 is placed to abut on an upper surface of the foundation 3 and secured to the foundation 3 by an anchor bolt 12 having a lower end embedded in the foundation and a fastening nut 18 threadedly mounted on the anchor bolt.

A circular hole 35 is formed through the lower horizontal plate portion 32, and a circular plate 36 is fixedly fitted in the circular hole 35 from the inside of the joint device 30 having a box-like configuration. The circular plate 36 is circumferentially rotatable in the circular hole 35. A long hole 37 is formed through the circular plate 36. The anchor bolt 12 can be inserted through the long hole 37, and the long hole 37 has an axis extending radially from the center of the circular plate 36. Thus, the relative position between the anchor bolt 12 and the joint device 30 can be adjusted by adjusting the location in the long hole 37 through which the anchor bolt 12 is inserted and by rotating the circular plate to adjust the direction of the axis of the long hole 37. Thus, the column 1 can be easily erected at a desired position.

The joint device 30 is preferably set not to undergo large deformation or not to fracture before the joint bolt 13 breaks when a tensile force or compressive force is applied thereto from the column 1, and the material and the thickness of each portion are preferably so selected that the joint device 30 has sufficient strength and rigidity.

The foundation 3 includes a concrete wall portion having a flat upper surface finished with a primer 3a. The joint device 30 is placed on the flat surface finished with the primer 3a and secured by the anchor bolt 12.

The primer contains mortar or plaster, for example, and can be casted in a highly fluent state and cured. A material called leveler or self-leveling material can be used as the primer.

Figure 6A:
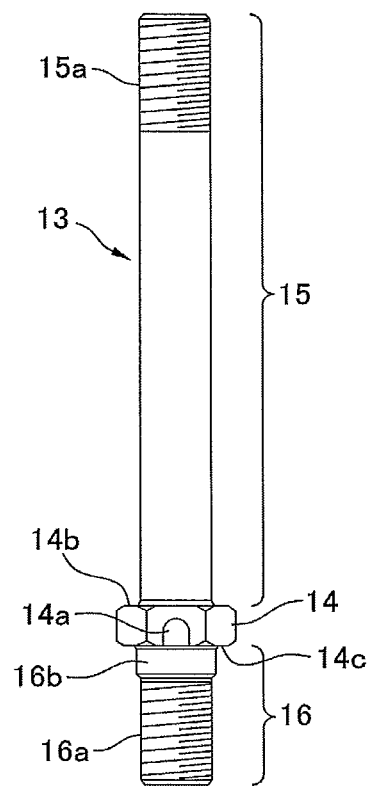
FIG. 6A shows a side view of the joint bolt used in the joint structure shown in FIG. 2 and FIG. 3.
Figure 6B:
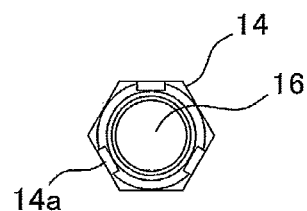
FIG. 6B shows a bottom view of the joint bolt used in the joint structure shown in FIG. 2 and FIG. 3.

As shown in FIGS. 6A and 6B, the joint bolt 13 has a flange 14, a proximal shaft portion 15 extending proximally from the flange 14, and a distal shaft portion 16 extending distally from the flange 14 and coaxially with the proximal shaft portion 15. The proximal shaft portion 15 has a proximal male thread 15a at a proximal end thereof, and the distal 1 shaft portion 16 has a distal male thread 16a at a distal end thereof.

The proximal shaft portion 15 is coupled to the screw member 11 by threadedly engaging the proximal male thread 15a with the female thread 11c formed in the hollow hole 11b of the screw member 11. The outside diameter of the proximal shaft portion 15 between the proximal male thread 15a and the flange 14 is smaller than the inside diameter of the hollow hole 11b so that the outer peripheral surface of the proximal shaft portion 15 can be separated from the inner peripheral surface of the hollow hole 11b of the screw member 11. Therefore, the portion of the proximal shaft portion 15 between the proximal male thread 15a and the flange 14 is allowed to expand and contract in the hollow hole 11b.

The flange 14 is formed to extend radially outward from the outer peripheral surface of the proximal shaft portion 15 or the distal shaft portion 16 and has a hexagonal plan view shape. The flange 14 has a plurality of recesses 14a that formed in a distal side surface thereof.

When the proximal shaft portion 15 of the joint bolt 13 is inserted into the hollow hole 11b of the screw member, the proximal male thread 15a can be threadedly engaged with the female thread 11c formed at the bottom of the hollow hole 11b. Then, a tool, such as a spanner or wrench, is engaged with the side faces of the hexagonal flange 14 and the joint bolt 13 is rotated about the axis thereof. Then, a proximal side surface 14b of the flange 14 abuts against the end face of the screw member 11, and the flange 14 is firmly pressed against the end face of the screw member 11 when the flange 14 is fastened firmly. In other words, a tensile force is introduced into the portion of the joint bolt 13 between the proximal male thread 15a and the flange 14, and the portion undergoes elastic elongation.

The screw member 11 into which the joint bolt 13 has been threaded as described above can be threaded into a hole formed in the column by rotating the flange 14 with a tool engaged with the side faces of the flange 14. Then, as shown in FIG. 3, the screw member 11 can be threaded into the column 1 such that the distal surface 14c of the flange 14 is flush with the cutout face of the column 1 by rotating the flange 14 about the axis thereof from the distal shaft portion side with a tool engaged with the recesses 14a formed in the distal surface 14c of the flange 14.

The distal shaft portion 16 has a distal male thread 16a formed at a distal end thereof and an enlarged diameter portion 16b having a larger diameter than the distal male thread 16a.

The distal shaft portion 16 is inserted through a bolt hole 34 of the joint device 30, and the fastening nut 17 is threadably mounted on the distal male thread 16a. Then, the joint bolt 13 and the joint device 30 can be coupled to each other by fastening the fastening nut 17 with the horizontal plate portion 31 of the joint device 30 sandwiched between the fastening nut 17 and the flange 14.

The enlarged diameter portion 16b is formed between the flange 14 and the distal male thread 16a, and the outside diameter of the enlarged diameter portion 16b is so determined that only a small gap remains between the enlarged diameter portion 16b and the inner peripheral surface of the bolt hole 34 of the joint device 30 when the enlarged diameter portion 16b is inserted into the bolt hole 34 of the joint device 30. Thus, the joint bolt 13 and the joint device 30 are prevented from displacing relatively to each other in a direction perpendicular to the axis of the joint bolt 13.

The joint bolt 13 is preferably formed of a material which exhibits large plastic deformation before fracture, such as soft steel, and the material and the diameter thereof may be selected as appropriate based on the location where the joint structure is installed in a structural body, the dimensions of the members of the structural body and so on.

Figure 7:
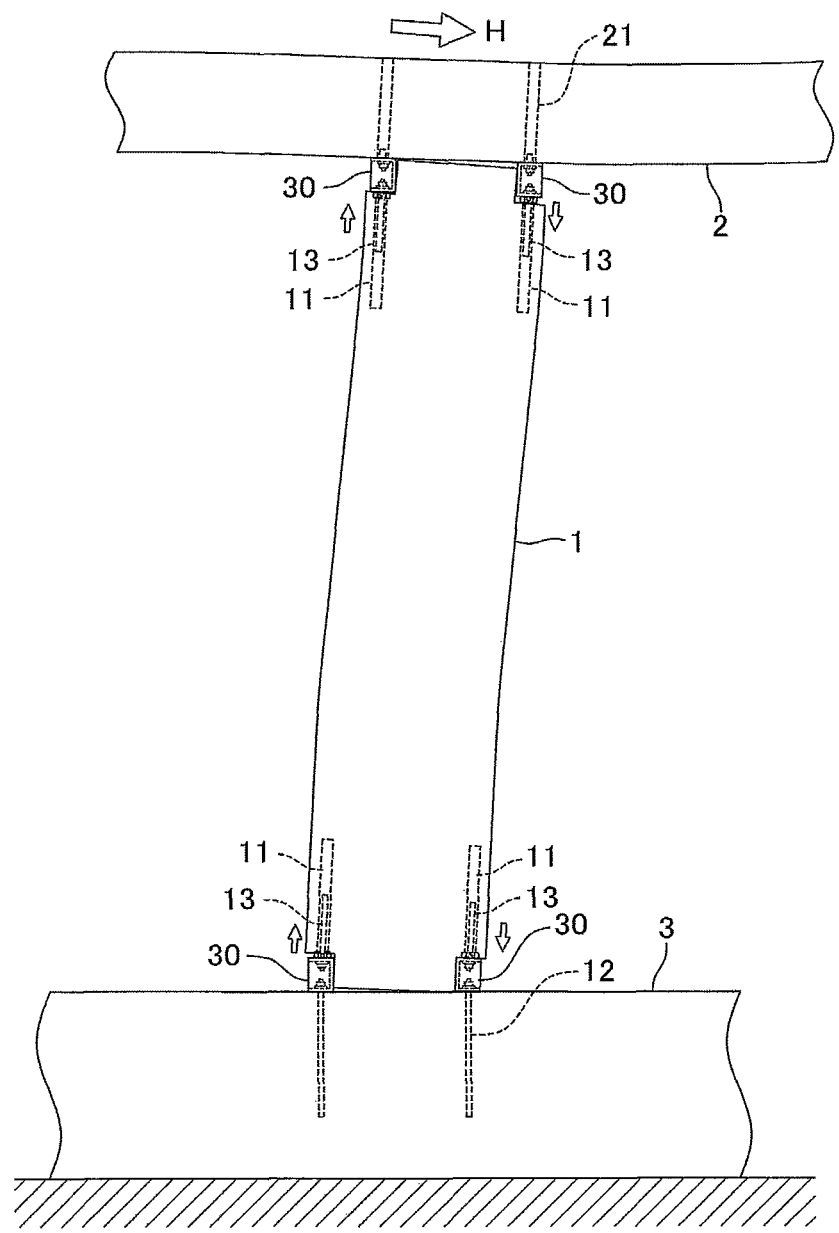
FIG. 7 is a schematic view, illustrating a manner of deformation of a column joined to a foundation by the joint structure shown in FIG. 2 and FIG. 3.

As shown in FIG. 7, when a bending moment is applied to a lower end of the column 1 joined to the foundation 3 via the screw members 11, the joint bolts 13, the joint devices 30 and the anchor bolts 12 as described above, an upward pulling force is applied to the screw member 11 on the tension side and the joint bolt 13 threadedly engaged with the female thread 11c of the screw member. However, because the fastening nut 17 is locked to the joint device 30 secured to the foundation, the distal shaft portion 16 and the flange 14 are constrained from displacing. Thus, a tensile force is applied to the proximal shaft portion 15, and a force acts to separate the proximal surface 14b of the flange 14 from the end face of the screw member 11.

Figure 8:
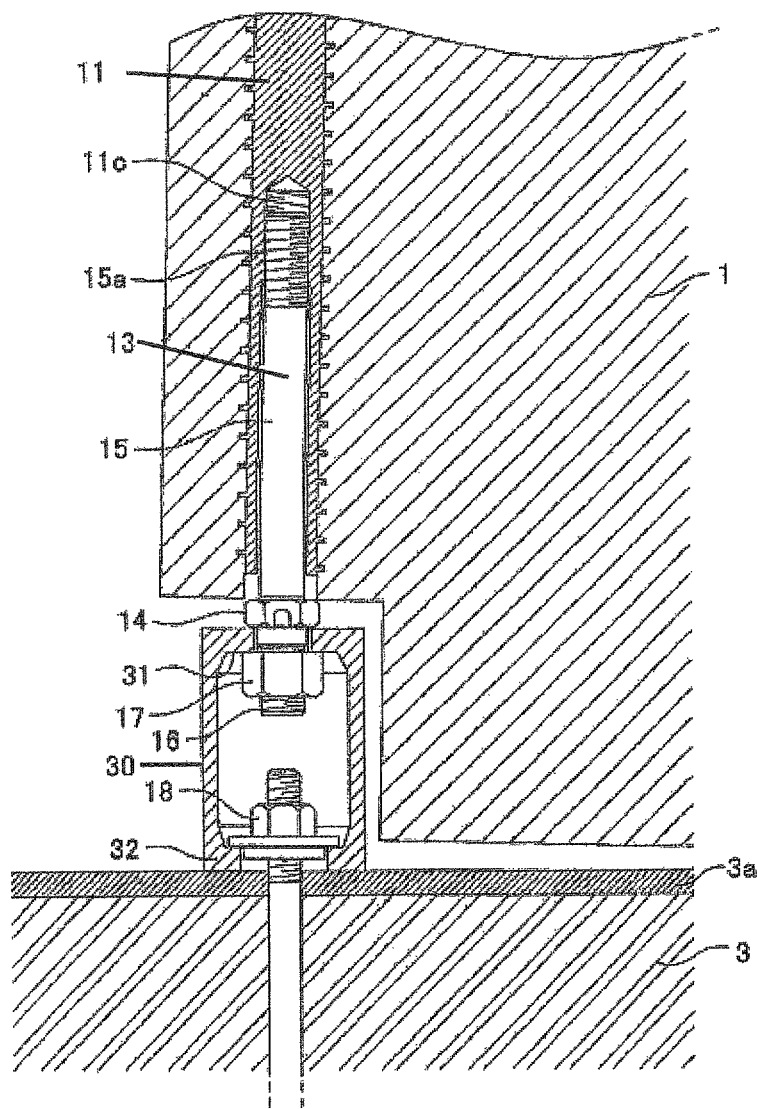
FIG. 8 is a cross-sectional view, illustrating the joint structure between the column and the foundation when deformation as shown in FIG. 7 occurs.

In this embodiment, the flange 14 is pressed against the end face of screw member 11 with a tensile force being introduced into the proximal shaft portion 15 of the joint bolt 13. Thus, when the force which acts to separate the flange 14 from the end face of the screw member 11 is weaker than the contact pressure, the flange 14 and the end face of the screw member 11 are held in contact with each other. Then, as shown in FIG. 8, when the contact pressure disappears and a further force acts to separate the flange 14 from the end face of the screw member 11, the flange 14 is separated from the end face of screw member 11 and the joint bolt 13 is pulled outwardly of the hollow hole 11b of the screw member 11. In other words, the deformation of the joint in response to an initial load before the contact pressure between the screw member 11 and the flange 14 disappears is suppressed to a low level.

As described above, the joint bolt 13 is elongated by a force which acts to pull the column 1 upward and the elongation is distributed from the proximal male thread 15a to the flange 14. Then, because the joint bolt 13 undergoes plastic deformation over a wide range in the length direction thereof when a larger bending moment is applied after the elongation exceeds the elastic region, the joint bolt 13 can ensure a large amount of deformation before ultimate fracture.

When a load in the opposite direction is generated after the joint bolt 13 undergoes plastic deformation as during an earthquake, compressive stress is applied to the proximal shaft portion 15 of the joint bolt 13 because the joint device 30 is held between the flange 14 and the fastening nut 17 as shown in FIG. 8. In other words, a force acts to press the proximal shaft portion 15 of the joint bolt 13 having a proximal end fixedly threaded with the female thread 11c into the hollow hole 11b. Thus, the joint bolt 13 undergoes deformation in the compression direction and the column 1 is returned to the original position where it is in contact with the joint device 30. When deformation further proceeds, a tensile force is applied to the joint bolt 13 used on the opposite side of the column cross-section. When the tensile stress applied to the joint bolt 13 exceeds its yield point, the joint bolt 13 undergoes plastic deformation.

As described above, because the joint bolt 13 has the flange 14, the vibrational energy is absorbed and the vibration is attenuated during an earthquake. In addition, because the flange 14 is formed integrally with the joint bolt 13, the strength of the portion of the joint bolt 13 which is pressed against the screw member 11 or the joint device 30 can be increased.

Figure 9:
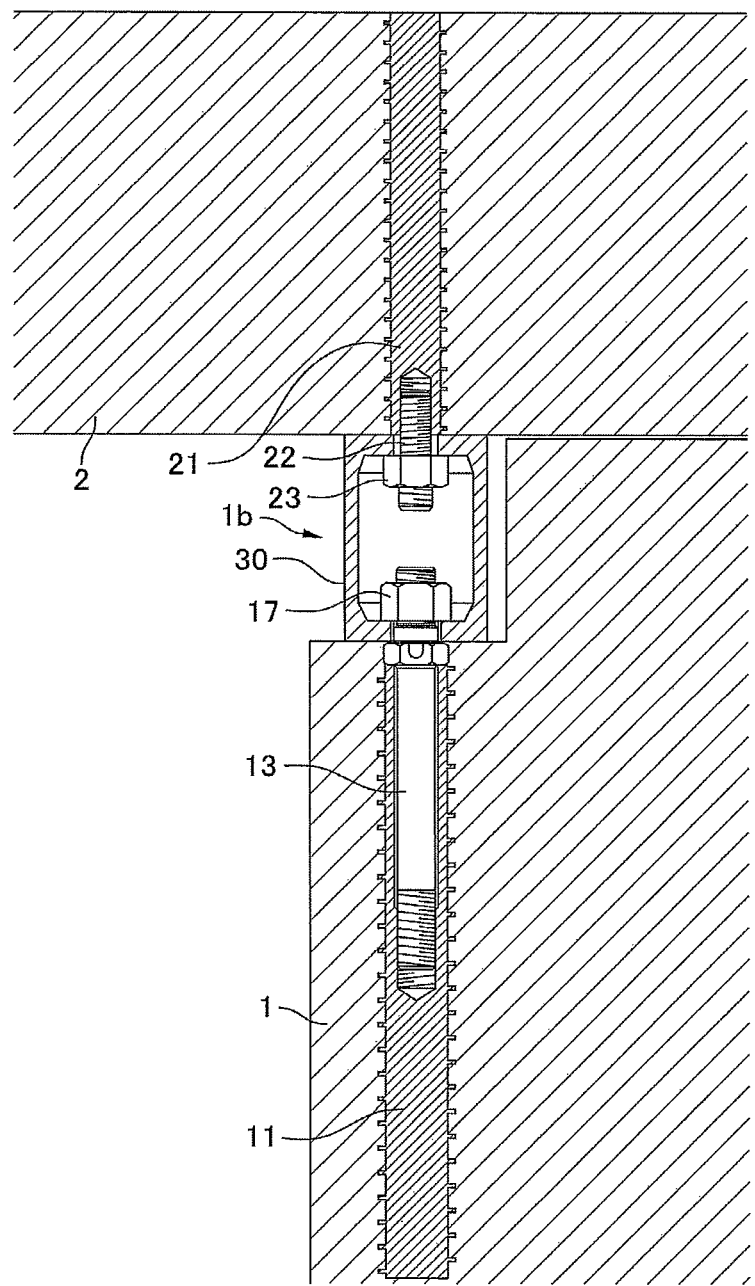
FIG. 9 is a cross-sectional view, illustrating an example in which the joint structure according to an embodiment of the present invention is applied to the joint between a column and a beam.

While the joint structure described above is used to join the wooden column 1 to the foundation 3, the wooden member joint structure, as shown in FIG. 9, according to an embodiment of the present invention can be also used to join an upper end of the wooden column 1 to the beam 2, as a mating member.

In this joint structure, the column 1 has cutouts 1b at both ends in the long side direction at the upper end thereof, and a screw member 11 is axially threaded into the column 1 from each cutout 1b. The screw members 11, the joint bolts 13, the fastening nuts 17 and the joint devices 30 are the same as those used in the joint structure shown in FIG. 3. Thus, these elements are designated by the same reference numerals, and their description is not repeated.

Screw members 21 for beam are vertically threaded into the beam 2 at locations corresponding to the screw members 11 threaded into the column 1, and a screw hole extending axially from an end face thereof is formed in each screw member 21. A female thread is formed in the inner peripheral surface of the screw hole, and a headless bolt 22 is threaded into the screw hole. The headless bolt 22 is inserted through the bolt hole of the horizontal plate portion of the joint device 30, and a fastening nut 23 threadably mounted on the headless bolt 22 is fastened, thereby to secure the joint device 30 to the screw member 21 threaded into the beam 2.

Even in such a case, a joint structure which can increase the amount of plastic deformation before ultimate fracture and absorb energy of earthquake efficiently can be formed as in the case where the column 1 is joined to the foundation 3. In addition, the column 1 can be joined to the beam 2 efficiently.

The joint structure of the present invention is also applicable to a joint between a shaft column and a beam or a joint between a shaft column and a foundation which is not expected to transfer a moment. In other words, the joint structure is also applicable to a joint where a shaft column is joined to a beam or foundation when there is a possibility that an axial tensile force is applied to the shaft column.

Figure 10:
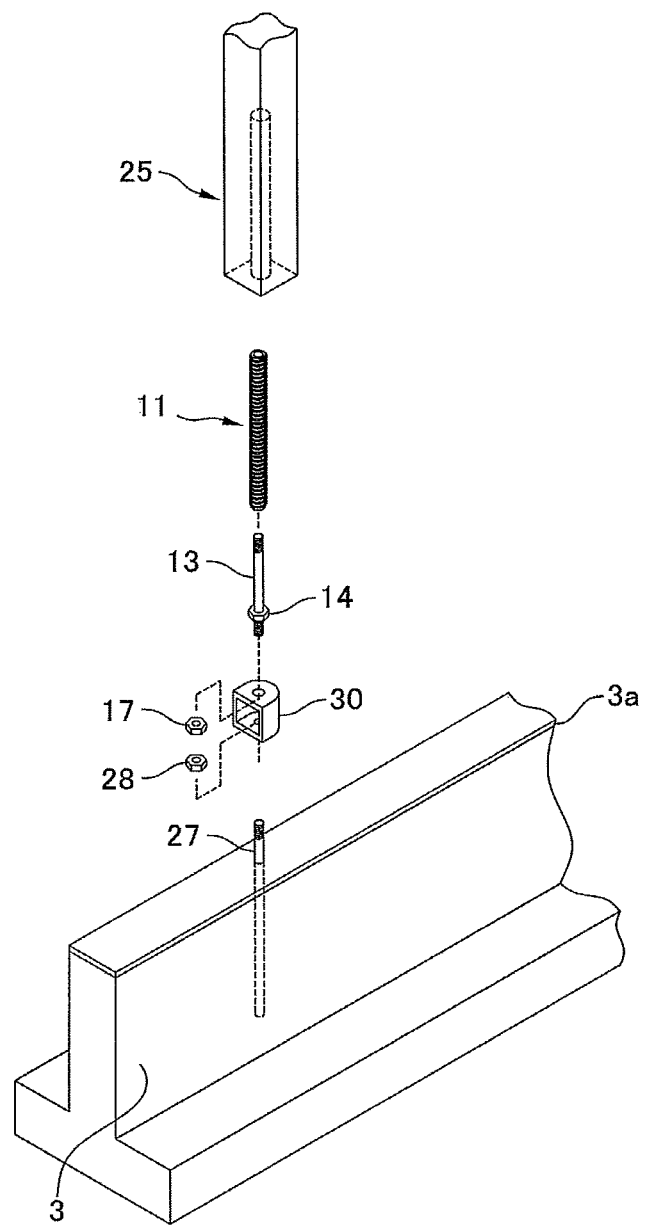
FIG. 10 is a schematic perspective view, illustrating an example in which the joint structure according to an embodiment of the present invention is applied to the joint between a shaft column to which an axial tensile force is applied and a foundation.

As shown in FIG. 10, in a structure by which a shaft column 25 is joined to the foundation 3, a screw member 11 is axially threaded into the shaft column 25 from a lower end thereof, and the lower end of the shaft column 25 is supported on the foundation 3 via the joint device 30. The screw member 11, the joint bolt 13, the fastening nut 17 and the joint device 30 used in this joint structure are also the same as those used in the joint structure shown in FIG. 3. Thus, these elements are designated by the same reference numerals, and their description is not repeated.

In this joint structure, the screw member 11 axially threaded into the shaft column 25 from a lower end thereof and the joint device 30 are coupled by the joint bolt 13. In other words, the joint bolt 13 is inserted into the hollow hole of the screw member 11 and threadedly engaged with the female thread at the bottom of the hollow hole of the screw member 11. Then, the joint bolt 13 and the joint device 30 are coupled to each other with the horizontal plate portion of the joint device 30 sandwiched between the flange 14 and the fastening nut 17. The joint device 30 is secured to the foundation 3 by a fastening nut 28 threadably mounted on an anchor bolt 27 protruding from an upper surface of the foundation 3, and the foundation 3 and the shaft column 25 are joined to each other via the anchor bolt 27, the joint device 30, the joint bolt 13 and the screw member 11.

In this joint structure, a tensile force applied to the shaft column 25 is transferred from the screw member 11 via the joint bolt 13, the joint device 30 and the anchor bolt 27 to the foundation 3, In addition, the present invention is not limited to the embodiments described above, and may be implemented in different forms within the scope of the present invention.

Figure 11A:
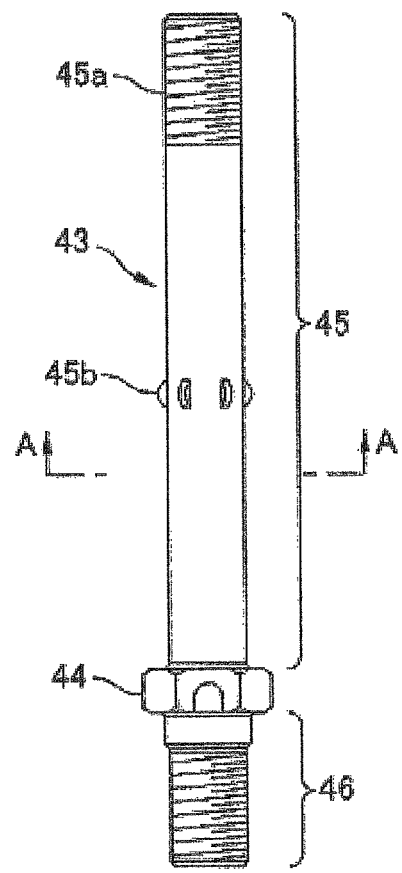
FIG. 11A shows a side view, illustrating another example of a joint bolt which can be used in the joint structure of an embodiment of the present invention.
Figure 11B:
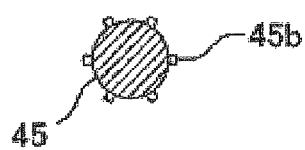
FIG. 11B shows a cross-sectional view, illustrating another example of a joint bolt which can be used in the joint structure of an embodiment of the present invention.

For example, a joint bolt having a configuration as shown in FIGS. 11A and 11B may be used.

A joint bolt 43 has projections 45b on an outer peripheral surface between the proximal male thread 45a and the flange 44. The projections 45b are generally equidistant from the proximal male thread 45a and the flange 44 in the axial direction of the joint bolt 43, and a plurality of projections 45b are circumferentially arranged at generally equal intervals. At the location where the projections 45b are formed, the distance between the inner peripheral surface of the hollow hole 11b of the screw member 11 and the joint bolt 43 is smaller and the joint bolt 43 is constrained from displacing in a direction perpendicular to the axial direction thereof. Thus, when a compressive force acts to press the joint bolt 43 into the hollow hole 11b, the joint bolt 43 is prevented from buckling.

Figure 12A:
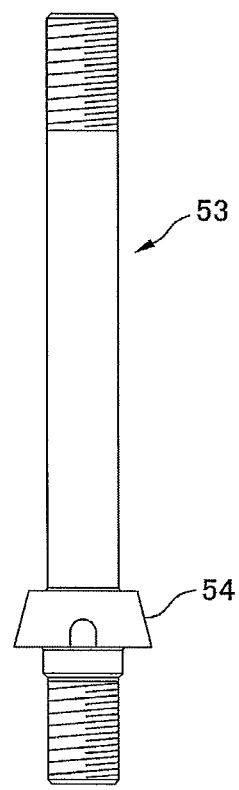
FIG. 12A shows a side view, illustrating another example of a joint bolt which can be used in the joint structure of an embodiment of the present invention.
Figure 12B:
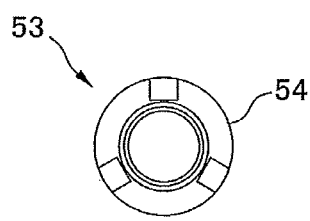
FIG. 12B shows a plan view, illustrating another example of a joint bolt which can be used in the joint structure of an embodiment of the present invention.

Alternatively, as shown in FIGS. 12A and 12B, a joint bolt 53 having a flange 54 having the shape of a circular truncated cone with a cross-section the diameter of which is larger at the proximal side than the distal side, or the larger the cross-section shape, the closer to the proximal side the cross-section may be used.

Because the flange 54 having a cross-section increasing from distal to proximal, i.e., in the direction in which the joint bolt 53 is threaded into the screw member 11, when the screw member 11 with the joint bolt 53 installed therein is threaded into the column 1, the outer peripheral surface of the flange 54 can be pressed in a wedge-like manner against the inner peripheral surface of the hole formed in the column 1. In other words, when a hole for receiving the screw member 11 is formed in the column 1 and the joint bolt 53 is threaded into the hole until the distal surface of the flange 54 is flush with the surface of the column 1 into which the screw member 11 is threaded, the flange 54 is pressed against the inner peripheral surface of the hole formed in the column 1. The flange 54 is therefore constrained from displacing laterally.

As a result, the joint bolt 53 and the screw member 11 are constrained from relatively displacing in a direction perpendicular to the axis of the joint bolt 53, and relative displacement between the column 1 and the foundation 3 or between the column 1 and the beam 2 can be prevented.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS

1: column
1a, 1b: cutout
2: beam
3: foundation
10: rigid frame body
11: screw member
11a: protrusion
11b: hollow hole
11c: female thread
12: anchor bolt
13: joint bolt
14: flange of joint bolt
14a: recess of flange
14b: proximal surface of flange
14c: distal surface of flange
15: proximal shaft portion of joint bolt
15a: proximal male thread
16: distal shaft portion of joint bolt
16a: distal male thread
16b: enlarged diameter portion
17, 18: fastening nut
21: screw member for beam
22: headless bolt
23: fastening nut 25: shaft column
27: anchor bolt
28: fastening nut
30: joint device
31: upper horizontal plate portion
32: lower horizontal plate portion
33: side plate portion
34: bolt hole
35: circular hole
36: circular plate
37: long hole
43: joint bolt
44: flange of joint bolt
45: proximal shaft portion of joint bolt
45*a*: proximal male thread
45*b*: projection
46: distal shaft portion of joint bolt
53: joint bolt
54: flange of joint bolt

What is claimed is:

1. A wooden member joint structure, comprising:
   a screw member having a shaft portion and a spiral blade formed on an outer peripheral surface of the shaft portion, wherein a hollow hole is formed in the screw member and the hollow hole is extending axially from an end face of the shaft portion, the screw member being for fixedly threaded into an opening defined in a wooden member used as a column of a wooden building;
   a joint bolt inserted into the hollow hole of the screw member, the joint bolt having a proximal end threadedly joined with a female thread formed in the vicinity of the bottom of the hollow hole; and
   a joint device coupled to a distal end of the joint bolt, the joint device being secured to a mating member to which the wooden member is to be joined;
   wherein the wooden member joint structure is for joining the wooden member to the mating member via the screw member, the joint bolt and the joint device,
   the joint bolt has a flange, a proximal shaft portion is extending proximally from the flange, and a distal shaft portion is extending distally from the flange and coaxially with the proximal shaft portion;
   the flange is firmly pressed against an end face of the shaft portion of the screw member by threading the proximal shaft portion into the female thread through the hollow hole of the screw member so that the flange is provided in the opening defined in the wooden member; and
   a portion of the proximal shaft portion between a portion threaded into the female thread and the flange is separated from an inner peripheral surface of the hollow hole;
   the wooden member joint structure further comprising a nut threadedly mounted on the distal shaft portion;
   wherein the joint device and the joint bolt are coupled to each other with the joint device clamped between the nut and the flange,
   the portion of the proximal shaft portion separated from the inner peripheral surface of the hollow hole is a portion for absorbing energy of a force causing a plastic deformation when the force acts to separate the joint device from the screw member and the force allows the joint bolt to undergo the plastic deformation;
   a plurality of recesses are formed at a distal surface of the flange facing away from the screw member, the recesses being engageable with a tool for rotating the joint bolt about an axis thereof in either direction, and a depth of the recesses being smaller than a thickness of the flange, and
   the screw member is threaded into the column such that the distal surface of the flange is flush with an end face of the column by rotating the flange with the tool engaged with the recesses.

2. The wooden member joint structure according to claim 1, wherein the distal shaft portion has a male thread portion having a male thread with which the nut is threadedly engageable, and an enlarged diameter portion between the male thread portion and the distal surface of the flange, the enlarged diameter portion having an outside diameter greater than an outside diameter of the male thread portion.

3. The wooden member joint structure according to claim 2, wherein the joint bolt has a projection on an outer peripheral surface of the portion between the portion threaded into the female thread in the hollow hole and the flange, to decrease the distance to the inner peripheral surface of the hollow hole.

4. The wooden member joint structure according to claim 2, wherein the flange has a dimension measured perpendicular to an axis of the distal shaft portion which increases from a proximal side to a distal side of the flange.

5. The wooden member joint structure according to claim 2, wherein the female thread formed in the hollow hole of the screw member is located at a middle portion in an axial length of the screw member.

6. The wooden member joint structure according to claim 1, wherein the joint bolt has a projection on an outer peripheral surface of the portion between the portion threaded into the female thread in the hollow hole and the flange, to decrease the distance to the inner peripheral surface of the hollow hole.

7. The wooden member joint structure according to claim 6, wherein the flange has a dimension measured perpendicular to an axis of the distal shaft portion which increases from a proximal side to a distal side of the flange.

8. The wooden member joint structure according to claim 6, wherein the female thread formed in the hollow hole of the screw member is located at a middle portion in an axial length of the screw member.

9. The wooden member joint structure according to claim 1, wherein the flange has a dimension measured perpendicular to an axis of the distal shaft portion which increases from a proximal side to a distal side of the flange.

10. The wooden member joint structure according to claim 9, wherein the female thread formed in the hollow hole of the screw member is located at a middle portion in an axial length of the screw member.

11. The wooden member joint structure according to claim 1, wherein the female thread formed in the hollow hole of the screw member is located at a middle portion in an axial length of the screw member.

* * * * *